United States Patent
Kulesha

(10) Patent No.: US 8,652,388 B2
(45) Date of Patent: Feb. 18, 2014

(54) ROTATIONAL VACUUM ASSISTED RESIN TRANSFER MOLDING

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 1509 days.

(21) Appl. No.: 11/304,286

(22) Filed: Dec. 15, 2005

(65) Prior Publication Data

US 2007/0141334 A1   Jun. 21, 2007

(51) Int. Cl.
B28B 1/20 (2006.01)

(52) U.S. Cl.
USPC ............ 264/311; 264/316; 264/310; 264/511

(58) Field of Classification Search
USPC .................................. 264/316, 310, 311, 511
See application file for complete search history.

(56) References Cited

U.S. PATENT DOCUMENTS

| | | | |
|---|---|---|---|
| 3,622,824 A | 11/1971 | Atlee | |
| 3,787,141 A | 1/1974 | Walsh | |
| 3,924,096 A | 12/1975 | Yanakieva et al. | |
| 3,975,069 A | 8/1976 | DeLucia | |
| 4,040,359 A | 8/1977 | Blajda et al. | |
| 4,043,721 A | 8/1977 | Lemelson | |
| 4,123,307 A | 10/1978 | Lemelson | |
| 4,315,776 A | 2/1982 | Pitler | |
| 4,940,940 A | 7/1990 | Leroux | |
| 4,970,927 A | 11/1990 | Benuzzi | |
| 5,005,786 A | 4/1991 | Okamoto et al. | |
| 5,178,316 A | 1/1993 | Block | |
| 5,221,390 A | 6/1993 | Persson et al. | |
| 5,247,563 A | 9/1993 | Block et al. | |
| 5,257,493 A | 11/1993 | Cocchi et al. | |
| 5,357,180 A | 10/1994 | Speicher | |
| 5,393,215 A * | 2/1995 | Donovan, Sr. | ............. 425/129.1 |
| 5,530,733 A | 6/1996 | Eggleston et al. | |
| 5,547,410 A | 8/1996 | Eggleston et al. | |
| 5,577,093 A | 11/1996 | Benz et al. | |
| 5,714,104 A * | 2/1998 | Bailey et al. | ................... 264/254 |
| 5,810,562 A | 9/1998 | Byrnes et al. | |
| 6,433,451 B1 | 8/2002 | Cherciu | |
| 6,440,252 B1 | 8/2002 | Biegelsen et al. | |
| 6,517,618 B2 | 2/2003 | Foucher et al. | |
| 6,549,327 B2 | 4/2003 | Foucher et al. | |
| 6,640,451 B1 | 11/2003 | Vinarcik | |
| 6,846,377 B2 | 1/2005 | Biegelsen et al. | |
| 7,678,317 B2 | 3/2010 | Khouri et al. | |

(Continued)

OTHER PUBLICATIONS

Brittles, P., New Developments in Resin Transfer Molding, Proc. 19th International Composites Congress (1994), pp. 11-26.*

(Continued)

Primary Examiner — Christina Johnson
Assistant Examiner — Saeed Huda
(74) Attorney, Agent, or Firm — Yee & Associates, P.C.

(57) ABSTRACT

Thickness gradients in large, cobonded composite structures resulting from gravity-induced resin migration during curing is substantially reduced by rotating the structure during the resin infusion and curing stages. The layup for the structure is placed on a rotatable tool fixture and vacuum bagged. The tool fixture is mounted on a central support tube provided with motors for rotating the tool fixture about the axis of the tube. The tube has internal passageways that deliver resin to the bagged layup and carry away excess resin from the layup using vacuum pressure. The resulting composite structures exhibit thickness gradients less than 10%.

9 Claims, 2 Drawing Sheets

(56) References Cited

U.S. PATENT DOCUMENTS

| | | |
|---|---|---|
| 2002/0185216 A1 | 12/2002 | Biegelsen et al. |
| 2002/0186450 A1 | 12/2002 | Foucher et al. |
| 2003/0002132 A1 | 1/2003 | Foucher et al. |
| 2003/0227108 A1 | 12/2003 | Okerson |
| 2005/0103431 A1 | 5/2005 | Khouri et al. |

OTHER PUBLICATIONS

Zhang, Chuck, Final Technical Report, Grant#: N00014-00-1-0548, The Effects of Physical Composite Particle Parameters on the Efficacy of a Proprietary Sound-Attenuation Technology and Its Application to Advanced Structural Composites, Mar. 28, 2003, 6 pages.*

* cited by examiner

ROTATIONAL VACUUM ASSISTED RESIN TRANSFER MOLDING

FIELD OF THE INVENTION

This invention generally relates to vacuum assisted resin transfer molding, and deals more particularly with a method and apparatus for reducing thickness gradients in molded composite parts caused by gravity-induced settling of the resin during curing.

BACKGROUND OF THE INVENTION

Vacuum-assisted resin transfer molding (VARTM) is being used more frequently to mold large composite structures, such as sections of aircraft. VARTM is a variant of traditional resin transfer molding (RTM), possessing advantages over conventional RTM by eliminating matched-metal tooling costs, reducing volatile emissions and allowing for low injection pressures. In VARTM, vacuum pressure is used to force liquid resin into dry composite reinforcements that have been laid in a sealed mold, often in the form of a preform. The mold can be a one sided tool with a vacuum bag, a two sided matched tool with a vacuum seal, or a soft bag enclosing the entire structure to be molded. Vacuum pressure is used to pull or drive resin into the mold, thus VARTM is sometimes referred to as a vacuum infusion process. The selection of materials, arrangement of mold gates/vents and the selection of processing parameters often have a significant impact on product quality and process efficiency in VARTM.

When molding relatively large structures, such as an aircraft fuselage, gravitational effects on resin flow behavior can create undesirable thickness gradients in the finished structure. These gradients, which may approach 25% or more, result from the fact that the force imposed by gravity tends to draw the flowing resin downwardly toward the bottom of the molded structure during the curing process, until the resin is sufficiently cured to terminate its flow. As a result, wall thickness of the structure measured in bottom portions of the structure can be significantly greater than wall thickness near the top of the structure. Thickness gradients due to resin migration not only reduce the integrity of the molded structure, but also result in a structure that is unnecessarily heavy, since in order to achieve a minimum wall thickness at the top of the structure, wall thickness near the bottom of the structure is greater than necessary. In the case of aircraft structures, thickness gradients of the type described above make it difficult to produce complete fuselage sections having integral stringers and co-bonded fuselage frames.

Accordingly, there is a need in the art for an improved method and apparatus for manufacturing composite structures using VARTM which overcomes the deficiencies of the prior art discussed above. The present invention is directed to satisfying this need.

SUMMARY OF THE INVENTION

In accordance with one aspect of the invention, a composite fiber structure is formed by injecting resin into composite fiber layup, and rotating the resin injected layup to reduce gravity-induced migration of the resin through the layup. The thickness of the structure preferably has a vertical gradient less than about 10%. Rotation of the layup is commenced when resin injection begins, and is continued until the structure is cured sufficiently to terminate resin flow.

In accordance with another aspect of the invention, a method is provided for manufacturing a composite structure exhibiting reduced resin thickness gradient caused by gravity. The method comprises steps of: placing a composite fiber layup on a forming tool; introducing resin into the layup; applying a vacuum to the layup while the resin is being introduced; and, rotating the tool as the resin is introduced into the layup in order to reduce settling of the resin. The layup is formed by placing a dry preform on a female mandrel, and resin is introduced into the layup through a main support tube which mounts the tool for rotation on a pair of supports. The main support tube is also used to draw a vacuum on the structure in order to infuse the resin into the layup.

According to still another aspect of the invention, apparatus is provided for producing a composite fiber structure comprising a forming tool having the shape of the structure and upon which a laminate layup may be disposed. A mounting assembly is provided for mounting the tool for rotation about a central axis of rotation. An air tight flexible membrane covers the layup and a resin injection system is provided for injecting resin through the membrane into the layup. A vacuum system produces a vacuum within the membrane and urges the resin to pass through composite fibers forming the layup. A motor rotates the tool about the central axis of rotation at a rate which reduces gravity induced settling of the resin in the layup during curing.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
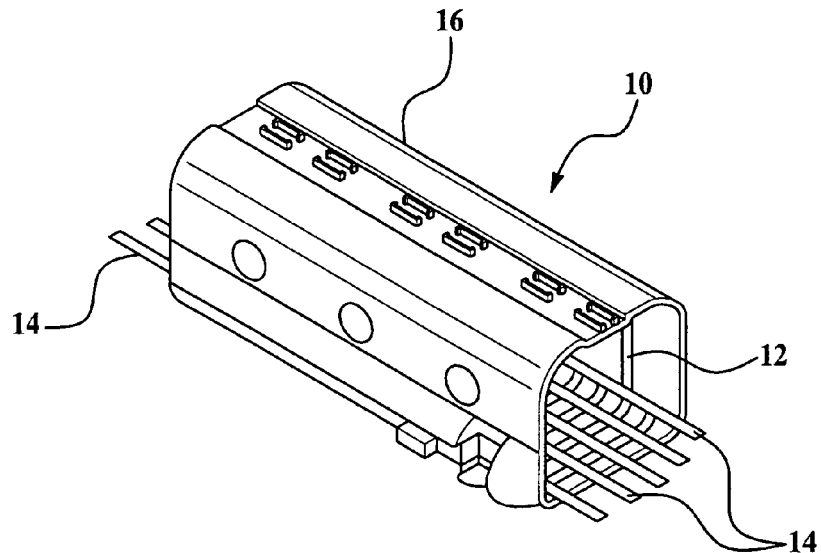
FIG. 1 is a perspective view of a section of an aircraft fuselage manufactured in accordance with the method and apparatus of the present invention.

Referring first to FIG. 1, a section of an aircraft fuselage generally indicated by the numeral 10 is essentially square in cross section and has walls formed from a laminated composite material well known in the art of aircraft construction. The fuselage 10 has an outer skin 16 which is co-bonded with a series of longitudinally spaced, transversely extending frame members 12, and a series of laterally spaced, longitudinally extending stringers 14. The frame members 12, stringers 14 and skin 16 are preferably formed using VARTM, in which these components are co-cured and co-bonded to form a highly rigid, rugged, unitized structure. In accordance with the present invention, the wall thickness of the skin 16 is substantially uniformed throughout the height of the fuselage 10, thus providing a structure which possesses high structural integrity with minimum weight.

Figure 2:
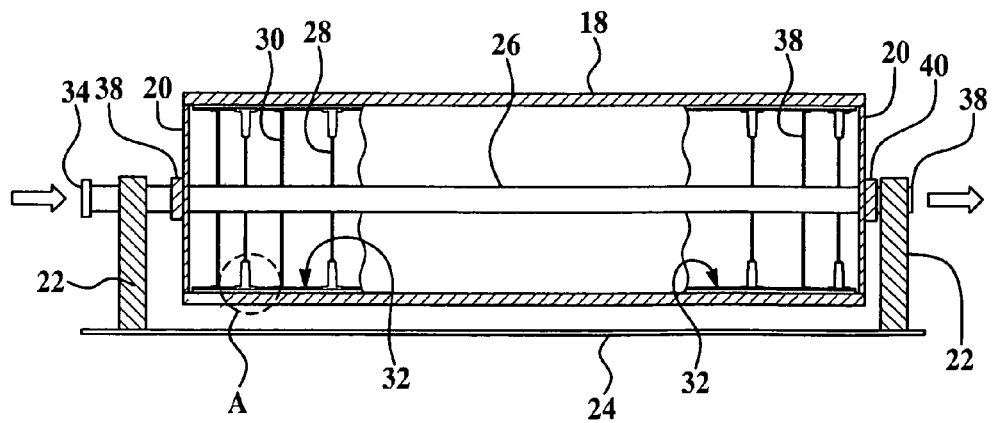
FIG. 2 is longitudinal cross sectional view of the apparatus of the present invention used to manufacture the fuselage shown in FIG. 1.
Figure 3:
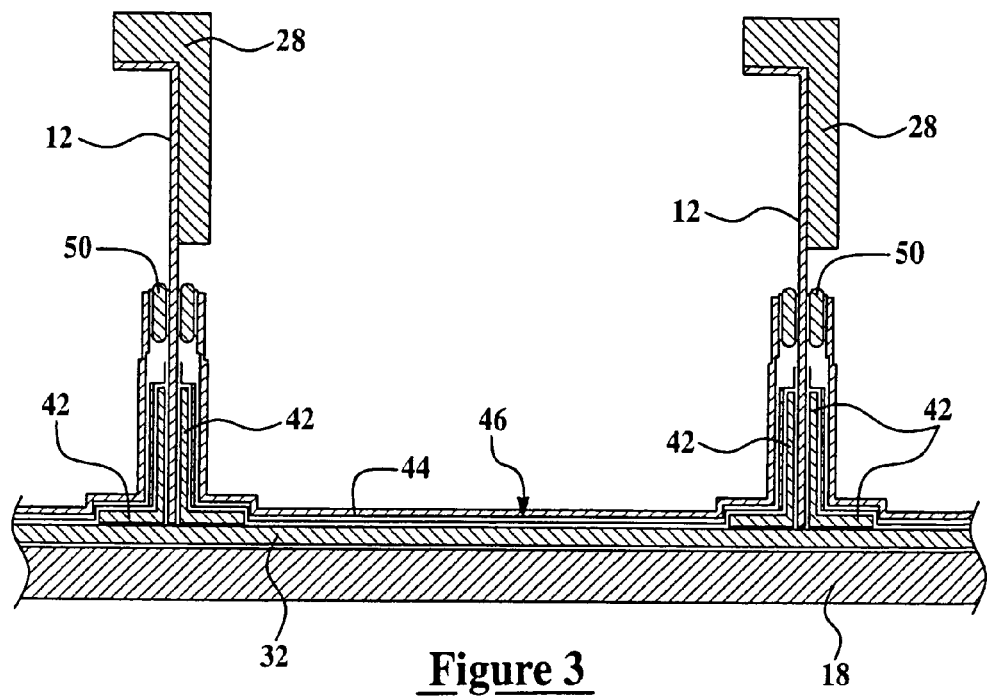
FIG. 3 is an enlarged view of a section of the apparatus shown in FIG. 2, designated by the letter "A".
Figure 4:
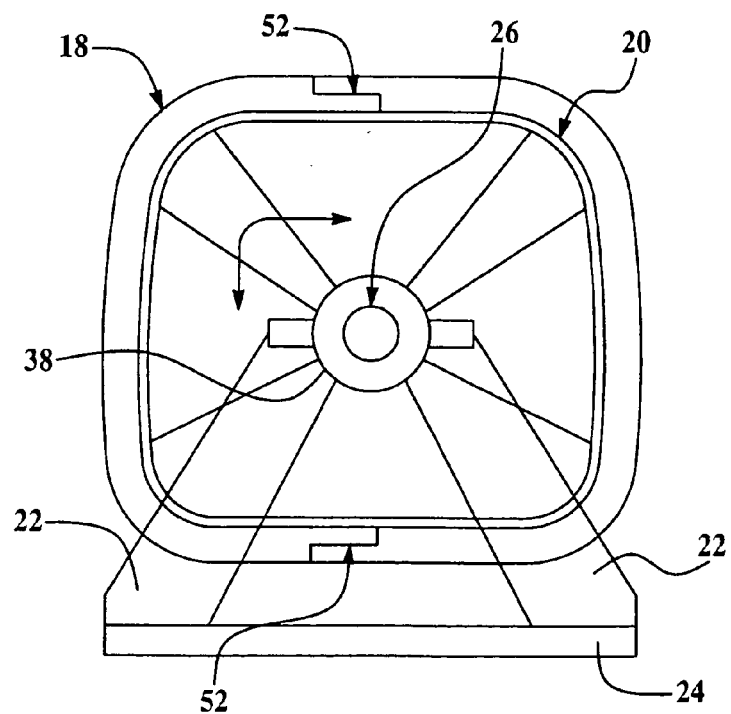
FIG. 4 is an end view of the apparatus shown in FIG. 2.

The fuselage 10, or similar large composite structure, is manufactured using the apparatus shown in FIGS. 2-4. A two piece tool 18 forms an elongate, hollow female mold having an internal surface defining a female mandrel corresponding to the shape of the fuselage skin 16. Tool 18 is of a type sometimes referred to as an OML (outside mold line) tool, in which the outside surface of the tool acts as the mold surface that forms the inside surface of the composite structure being molded. The two sections of the tool 18 are releasably held together by a suitable fasteners and are joined at a split line 52. After the finished structure is fully cured, the two halves of the tool 18 are removed so that the structure can be withdrawn from the tool 18. The tool 18 is held on a pair of tool supports 20 which in turn are journalled for rotation on a main support and distribution tube 26 which passes through the length of the tool 18, and is mounted on a pair of tool stands 22 supported on a base 24. A pair of motors 39, which may be electric or hydraulic, are secured to the tube 26 and are drivingly connected to the tool supports 20 so as to rotate the entire tool 18 around the tube 26.

The main support tube 26 is hollow, providing a passageway throughout its length to convey fluids. The input end 34 of the tube 26 is coupled with a suitable source (not shown) of resin. The exit end 40 of the main tube 26 is connected with a suitable source (not shown) for creating negative pressure, typically less than one atmosphere.

A composite layup, preferably in the form of a skin preform 32 is installed on the inner-mandrel surface of the tool 18. The preform 32 may comprise multiple layers of matting formed of composite fibers; the composition, thickness and the number of layers will depend on the particular application. Generally L-shaped frame members 12 are next installed within the tool 18. Frame members 12 may comprise precured, composite components which are held in place and located by series of frame locator tools 28 that are secured to the interior face of the tool 18. A pair of L-shaped support clips 42, also formed of pre-cured composite material are installed on opposite sides of each of the frame members 12, in contact with the inside face of the skin preform 32. An air tight, flexible membrane in the form of a vacuum bag 44 is disposed over the assembly comprising the skin preform 32, clips 42 and frame members 12. Bag seals 50 are provided where necessary, to provide an air tight seal between the bag 44 and frame members 12.

As shown in FIG. 2, a plurality of radially extending resin-injection tubes or conduits 30 are connected between the main support tube 26 and the bag 44. The resin injection tubes 30 are positioned near the entrance end 34 of tube 26 and function to deliver resin from tube 26 into the sealed layup. The resin flows through tubes 30 into the bag 44, and then along the inner surface of the preform 32, covering clips 42 and frame members 12. Air is evacuated from the bag 44 by means of a series of vacuum tubes or conduits 38 positioned near the exit 40 of the main tube 26. Vacuum tubes 38 are connected through the main tube 26 and the bag 44, thus placing the vacuum source in communication with the interior of the bag 44.

The vacuum created within bag 44 evacuates air from the bag, and the residual negative pressure forces the flowing resin to be infused into the layers of the skin preform 32. Excess resin is carried through the vacuum tubes 38 to the main support tube 34 and thence through the exit end 40 of the tube 26. The vacuum source then draws air through the exit 40, evacuating air from the bag 44 and creating internal negative pressure which draws resin into the main tube at the entrance 34. The resin flows through the main tube 26 into the resin injection tubes 30, entering the bag 40 and flowing over the surface of the entire layup. The negative pressure within the bag 44 causes the resin to be infused into the layup. Excess resin is carried away by the vacuum tubes 38 through the exit 40 of the main tube 26.

As resin begins to enter the main tube 26, motors 38 are turned on, causing the entire tool 18, and thus the layup, to rotate. The rate of rotation will depend upon the size of the tool 18, the composition of the resin as well as the layup. However the rotational rate should be chosen such that the tendency of the resin to settle due to gravity is offset or neutralized as a result of the layup being periodically inverted. In other words, the forces imposed by gravity on the layup and the resin are periodically inverted such that the resultant vertical force acting on the resin over a period of time is zero. As a result of this rotational technique, gravity induced sagging or settling of the resin is materially reduced, resulting in thickness gradients less than 10% throughout the entire structure.

Rotation of the tool 18 is continued through the entire cure cycle, or at least until the resin has hardened sufficiently to preclude settling. After curing, the tool 18 is removed and the formed composite structure is removed from the tool 18. The resulting structure, in this case a fuselage section, has integral stringers and co-bonded fuselage frames forming a substantially unitized structure wherein the skin and other components have an essentially uniform thickness throughout the structure.

Although this invention has been described with respect to certain exemplary embodiments, it is to be understood that the specific embodiments are for purposes of illustration and not limitation, as other variations will occur to those of skill in the art.

What is claimed is:

1. A method of manufacturing a composite structure comprising the steps of:
   using a tool comprising a first tube, a motor connected to the first tube, and a support connected to the motor, to the first tube, and to a mold, wherein the mold is disposed around the first tube at a radial distance relative to the first tube, wherein the mold comprises an inside surface, wherein the motor is configured to rotate the first tube, the support, and the mold substantially continuously in an angular direction, wherein the tool further comprises a second tube extending radially from the first tube and a third tube extending radially from the first tube, wherein the second tube and third tube both establish fluid communication between the first tube and a tubular space defined between a bag and the inside surface of the mold, and wherein using the tool comprises at least causing a composite fiber layup to be disposed inside the tubular space;
   introducing a resin into the composite fiber layup by injecting the resin through the first tube, and thereafter through the second and third tubes, into the tubular space, and onto the composite fiber layup;
   urging the resin into the composite fiber layup by applying a vacuum to the composite fiber layup while the resin is being introduced; and
   reducing settling of the resin in the composite fiber layup due to gravitational force by rotating the first tube, the support, and the mold in the angular direction, using the motor, as the resin is introduced into the composite fiber layup and as the vacuum is applied, wherein during rotation the composite fiber layup is periodically inverted with respect to the gravitational force; and
   forming the composite structure by curing the resin while rotating.

2. The method of claim 1, further comprising:
   installing the bag.

3. The method of claim 1, further comprising:
   placing composite fiber layup on the inner surface of the mold.

4. The method of claim 1, wherein rotating comprises rotating substantially continuously at a rate configured to substantially reduce settling of the resin due to the gravitational force.

5. The method of claim 1, wherein the composite fiber layup comprises a shape of a fuselage of an aircraft, and wherein the method further comprises:
   installing fuselage frame members on the composite fiber layup and co-bonding the fuselage frame members with the composite fiber layup.

6. The method of claim 1, wherein rotating comprises rotating at a rate such that, after curing, a thickness of the composite structure has a thickness gradient of less than about 10%.

7. The method of claim 1, wherein the composite structure is an aircraft fuselage.

8. The method of claim 5, wherein the method further comprises:
   installing aircraft stringers on the composite fiber layup and co-bonding the aircraft stringers with the composite fiber layup.

9. The method of claim 1, wherein the tool further comprises a vacuum tube through which the vacuum is applied, and wherein the method further comprises:
   drawing excess resin through the vacuum tube.

\* \* \* \* \*